(12) United States Patent
Kim (10) Patent No.: US 9,315,003 B2
(45) Date of Patent: Apr. 19, 2016

(54) APPARATUS FOR STICKING FILM ON DISPLAY PANEL

(71) Applicant: SAMSUNG DISPLAY CO., LTD., Yongin, Gyeonggi-Do (KR)

(72) Inventor: Dong-Sul Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 179 days.

(21) Appl. No.: 14/071,251

(22) Filed: Nov. 4, 2013

(65) Prior Publication Data

US 2014/0373996 A1  Dec. 25, 2014

(30) Foreign Application Priority Data

Jun. 21, 2013 (KR) .................. 10-2013-0071848

(51) Int. Cl.
| | |
|---|---|
| *B32B 37/00* | (2006.01) |
| *B32B 37/10* | (2006.01) |
| B32B 37/06 | (2006.01) |
| B32B 38/18 | (2006.01) |

(52) U.S. Cl.
CPC ............... *B32B 37/10* (2013.01); *B32B 37/003* (2013.01); *B32B 37/0046* (2013.01); *B32B 37/06* (2013.01); *B32B 38/1866* (2013.01); *B32B 2457/20* (2013.01); *Y10T 156/10* (2015.01)

(58) Field of Classification Search
CPC ............. B32B 37/10; G02F 1/13; G09F 9/00; B27D 3/00
USPC .................... 156/228, 580, 581, 583.1, 583.3
See application file for complete search history.

(56) References Cited

U.S. PATENT DOCUMENTS

| | | | | |
|---|---|---|---|---|
| 3,873,395 | A | * | 3/1975 | Ehrlich .......................... 156/382 |
| 5,472,549 | A | * | 12/1995 | Jurrius et al. .................. 156/311 |
| 7,963,311 | B2 | * | 6/2011 | Perttila et al. ................. 156/581 |

FOREIGN PATENT DOCUMENTS

| | | |
|---|---|---|
| KR | 2000-0009976 | 6/2000 |
| KR | 10-2011-0077886 | 7/2011 |
| KR | 10-2011-0122488 | 11/2011 |

* cited by examiner

*Primary Examiner* — James Sells
(74) *Attorney, Agent, or Firm* — F. Chau & Associates, LLC (57) ABSTRACT

A film sticking device includes a pressing part configured to press a film by contacting a surface of the film and pressing the film. A supporting part is coupled to the pressing part and supports the pressing part. A guiding part is configured to guide the supporting part and move the supporting part between a first position and a second position. The second position is separated from the first position. A body has one end coupled to the guiding part. The supporting part is positioned at the first position when a center part of the pressing part contacts the surface of the film.

20 Claims, 8 Drawing Sheets

FIG. 8

APPARATUS FOR STICKING FILM ON DISPLAY PANEL

CROSS-REFERENCE TO RELATED APPLICATION

This application claims priority under 35 U.S.C. §119 to Korean Patent Application No. 10-2013-0071848, filed in the Korean Intellectual Property Office on Jun. 21, 2013, the entire disclosure of which is incorporated by reference herein in its entirety.

TECHNICAL FIELD

The present disclosure relates to a display panel, and more particularly, to an apparatus for sticking a film on a display panel.

DISCUSSION OF RELATED ART

In general, in the field of display devices, there is a liquid crystal display (LCD), a plasma display device (PDP), an organic light emitting display (OLED), a field effect display (FED), and an electrophoretic display (EPD).

A process of manufacturing display devices listed above generally includes a film sticking process of attaching a film of a fine pattern or a polarization film to a substrate surface of the panel.

However, if a sticking device with a flat shape presses the upper surface of a film, the pressure applied may not be uniform across the upper surface of the film. Accordingly, the contact between the film and the display panel may be reduced such that the film and the display panel may be partially lifted from each other.

SUMMARY OF THE INVENTION

Exemplary embodiments of the present invention provide a film sticking device that uniformly sticks a film to a surface of a substrate or a display panel in a process of attaching the film to a surface of the substrate or the display panel.

A film sticking device includes a pressing part configured to press a film by contacting a surface of the film and pressing the film. The film sticking device includes a supporting part coupled to the pressing part and supporting the pressing part. The film sticking device includes a guiding part configured to guide the supporting part to move the supporting part between a first position and a second position. The second position is separated from the first position in a lower direction. A body having an end is coupled to the guiding part. The supporting part is positioned at the first position when a center part of the pressing part contacts the surface of the film.

The pressing part may be convex in the lower direction.

The pressing part may be transformed into a shape corresponding to the surface of the film.

The guiding part may include first and second stoppers facing each other and respectively positioned at the first and second positions. The guiding part may include a vertical member extending in a direction vertical to the first and second stoppers. Opposite ends of the vertical member may be respectively coupled to a side of the first stopper and a side of the second stopper. A connection member may be coupled to the supporting part. The connection member may move between the first and second stoppers according to the vertical member. The connection member may contact the first stopper when the center part of the pressing part contacts the surface of the film.

The connection member may include a penetration hole passing through the vertical member.

The supporting part may include a first supporting member and a second supporting member. A first end of the first supporting member and a first end of the second supporting member may be coupled to the connection member. A second end of the first supporting member and a second end of the second supporting member may be respectively connected to ends of the pressing part.

The first and second supporting members may be arranged in parallel to each other.

First ends of the first and second supporting members may be connected to the connection member and may be hinge-rotated.

The pressing part may be transformed into a shape corresponding to one surface of the film when an angle formed by extending the pair of supporting members is a maximum angle.

The pressing part may be formed of a stainless use steel (SUS) or a shape memory alloy.

A width of the pressing part may be in a range of 10 mm-30 mm.

A heating part may be coupled to a surface of the pressing part and may heat the pressing part.

The heating part may be heated by a resistance heating method.

The heating part may be made of a nichrome wire or a metal chromium wire.

The film sticking device according to exemplary embodiments of the present invention may apply uniform force to the upper surface of the film in the length direction of the film. The film may be uniformly attached to the upper surface of the substrate or the display panel.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

In the following detailed description, exemplary embodiments of the present invention have been shown and described by way of illustration. As those skilled in the art would realize, the exemplary embodiments of the present invention may be modified in various different ways, all without departing from the spirit or scope of the present invention. The drawings and description are to be regarded as illustrative in nature and not restrictive. Like reference numerals may designate like elements throughout the specification.

In addition, the size and thickness of each configuration shown in the drawings are shown for better understanding and ease of description, but the present invention is not limited thereto.

In the drawings, the thickness of layers, films, panels, regions, etc., may be exaggerated for clarity. In the drawings, for better understanding and ease of description, the thickness of some layers and areas may be exaggerated. It will be understood that when an element such as a layer, film, region, or substrate is referred to as being "on" another element, it can be directly on the other element or intervening elements may also be present.

In the specification, "on" may imply being positioned above or below a target element and does not imply being necessarily positioned on top of another object on the basis of a direction of gravity.

Figure 1:
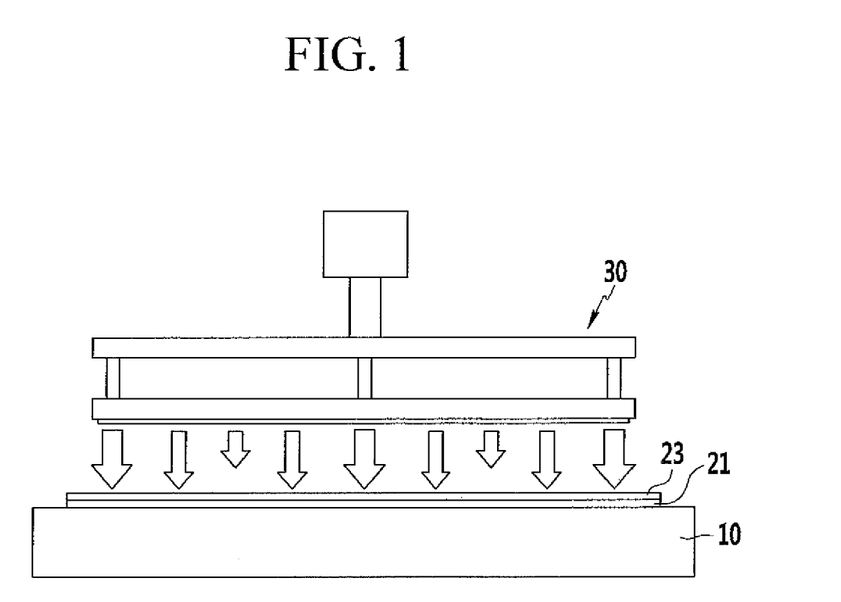
FIG. 1 is a cross-sectional view of an exemplary sticking process of a film and a display panel.

FIG. 1 is a view showing an exemplary process of attaching a film 23 to one side of a display panel 21. After positioning the film 23 at an upper surface of the display panel 21 disposed on a working stage 10, the film 23 may be pressed corresponding to a sticking surface of the film 23 by using a pressing device parallel in a horizontal direction to attach the film 23 to the display panel 21. Referring to FIG. 2 to FIG. 5, a film sticking device according to exemplary embodiments of the present invention presses an upper surface of a film 23 at a predetermined pressure such that the film 23 is uniformly attached to the upper surface of the substrate or the display panel 21.

The film 23 may include a film formed with a fine pattern or a polarization film, however it is not limited thereto, and the film 23 may include various films that may be attached by the film sticking device in the display device. The film 23 may be attached to a display device or various constituent elements used to manufacture the display device as well as the substrate or the display panel.

Figure 2:
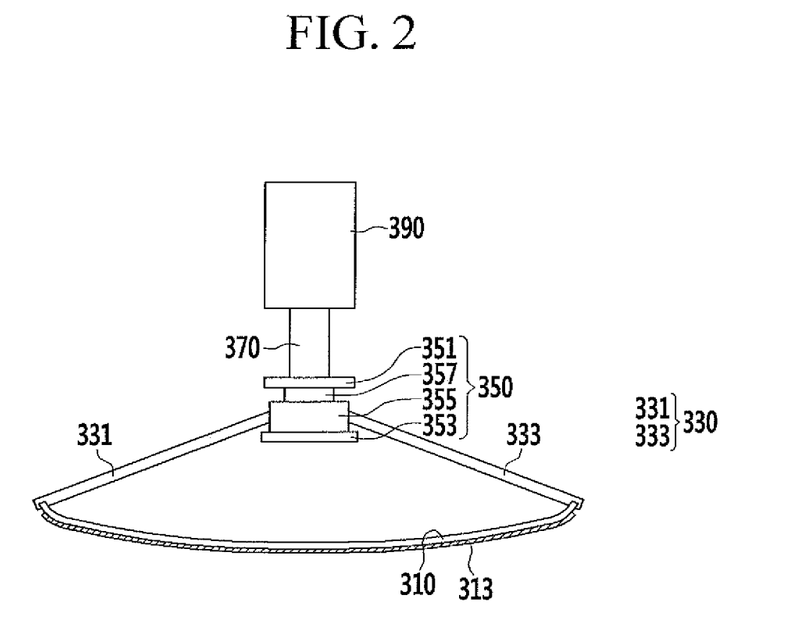
FIG. 2 is a cross-sectional view of a film sticking device according to exemplary embodiments of the present invention.

Referring to FIG. 2, the film sticking device according to an exemplary embodiment of the present invention may include a pressing part 310, a supporting part 330, and a guiding part 350.

The pressing part 310 may directly contact the upper surface of the film 23 thereby applying a uniform pressure to the film 23. The pressing part 310 applies the uniform pressure to the film 23 such that a target to which the film 23 is attached, for example, the display panel 21, and the film 23 may be attached to each other.

Figure 3:
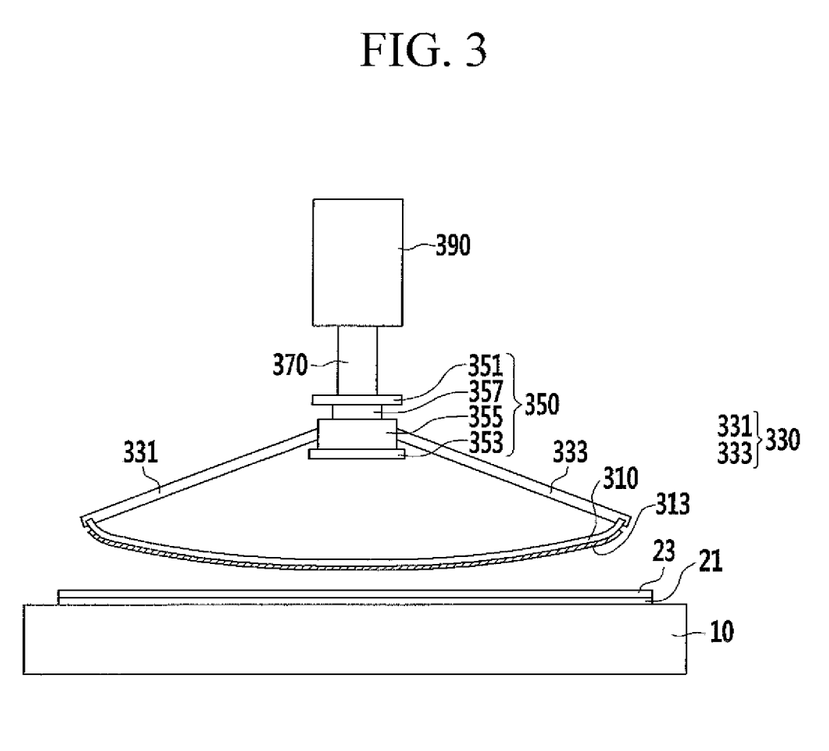
FIG. 3 is a schematic diagram illustrating a process of sticking a film on a display panel by a film sticking device according to exemplary embodiments of the present invention.
Figure 4:
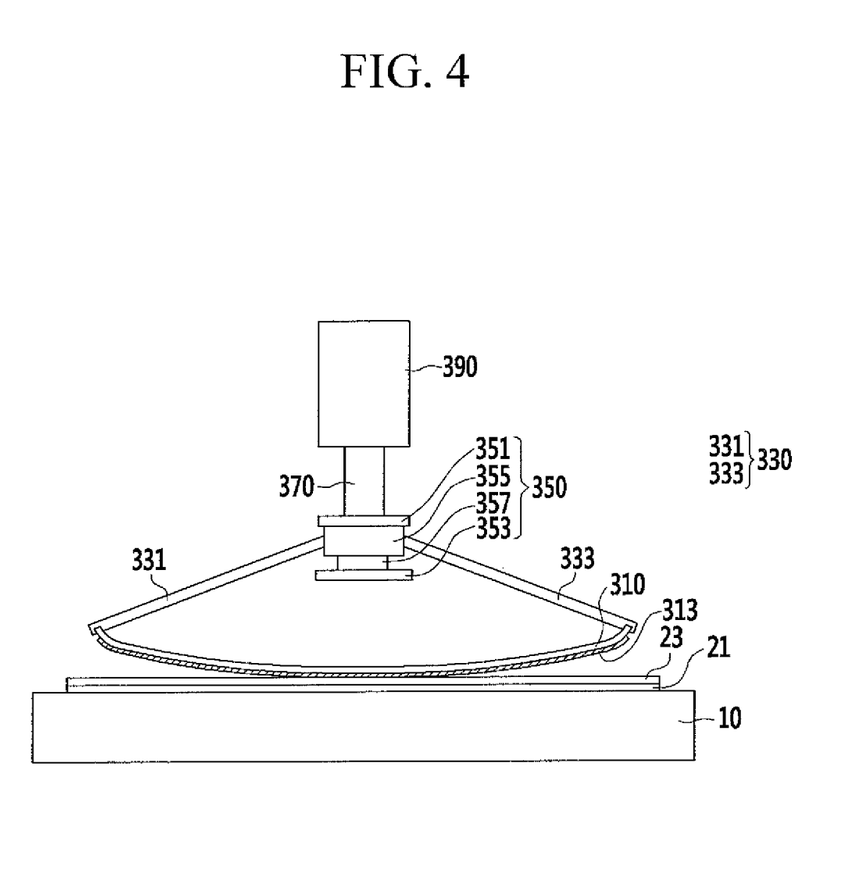
FIG. 4 is a schematic diagram illustrating a process of sticking a film on a display panel by a film sticking device according to exemplary embodiments of the present invention.
Figure 5:
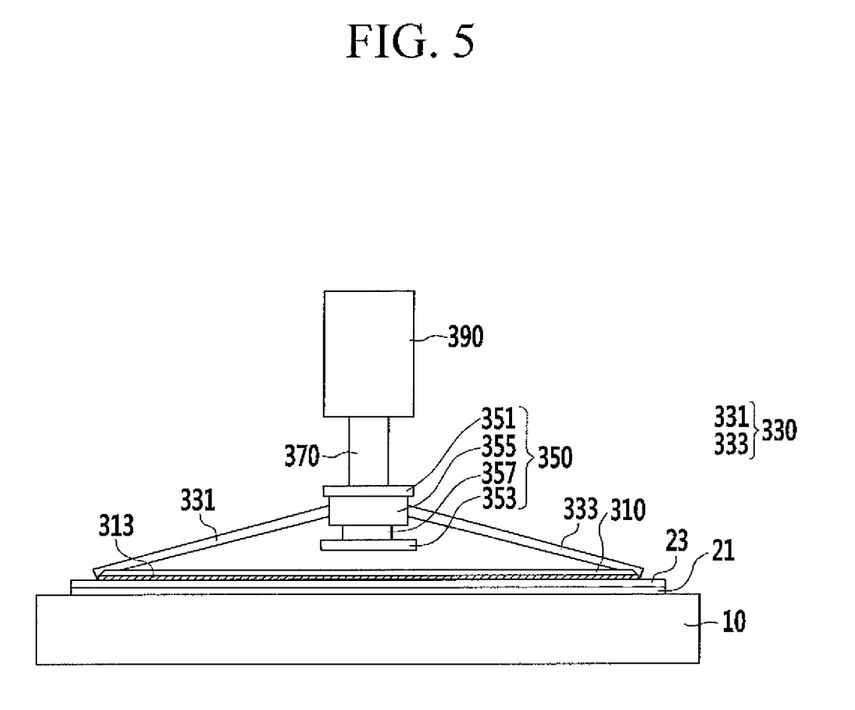
FIG. 5 is a schematic diagram illustrating a process of sticking a film on a display panel by a film sticking device according to exemplary embodiments of the present invention.

Referring to FIG. 3 to FIG. 5, the pressing part 310 may be convex in a lower direction.

By providing the convex pressing part 310 in the lower direction, when the pressing part 310 contacts the film, a center part of the pressing part 310 first contacts the film 23. The center part of the pressing part 310 may be a lowest point of the pressing part 310.

After the center part of the pressing part 310 contacts the film 23, the pressing part 310 may gradually contact the upper surface of the film 23 in the right and left directions with respect to the center part of the pressing part 310.

At this time, the pressing part 310 that is convex in the lower direction may be transformed into a shape corresponding to the shape of the film 23. For example, the pressing part 310 may be transformed into a flat shape parallel to the horizontal direction.

After the pressing part 310 is transformed into the flat shape, if the film 23 is pressed by the pressing part 310 in a length direction of the film 23, constant pressure may be applied across the horizontal direction.

The film sticking device according to exemplary embodiments of the present invention may apply uniform pressure to the film 23 across the horizontal direction through the pressing part 310.

When the film 23 is completely attached to the display panel 21, the pressing part 310 may be separated from the film 23.

At this time, the pressing part 310 may return to the original shape that is convex in the lower direction.

The pressing part 310 may be made of a stainless use steel (SUS) or a shape memory alloy. However, it is not limited thereto, and the pressing part 310 may be formed of various materials having a restoring force after separating from the film 23.

The pressing part 310 may have a width of 10 mm-30 mm. However, the width of the pressing part 310 is not limited thereto, and the width of the pressing part 310 may be selected according to the width of the film to which the pressing part 310 is attached.

A heating part 313 may heat the pressing part 310. The heating part 313 may be coupled to a side of the pressing part 310. By heating the pressing part 310 contacting the film 23, the film 23 may be attached to the substrate or the display panel.

The heating part 313 may be formed at one surface of the pressing part 310 as a member of the plate shape. The heating part 313 may be heated by a resistance heating method. For example, a resistance line may be installed at one surface of the pressing part 310 and the heating may be performed while a current flows.

The resistance line of the heating part 313 may be formed of nichrome wire or a metal chromium line. However, the resistance line of the heating part 313 is not limited thereto, and may be formed of various materials used to heat by, for example, the resistance heating method.

Referring to FIG. 2, both ends of the pressing part 310 may be coupled to the supporting part 330 supporting the pressing part 310. The supporting part 330 may be formed of supporting members 331 and 333.

One end of each of the supporting members 331 and 333 may be coupled to an opposite end of the pressing part 310. The other end of each of the supporting members 331 and 333, for example, two neighboring ends of the pair of supporting members 331 and 333 not coupled to the supporting part 310 may be coupled to a connection member 355 of the guiding part 350.

The two neighboring ends of the pair of supporting members 331 and 333 coupled to the connection member 355 may be rotated. As shown in FIG. 5, for example, the two neighboring ends of the pair of supporting members 331 and 333 may be hinge-coupled to the connection member 355. A detailed description thereof will be given later.

After the center part of the pressing part 310 contacts the film 23, when the shape of the pressing part 310 is changed into the flat shape, an angle formed between the pair of supporting members 331 and 333 coupled to the connection member 355 may be gradually increased.

Referring to FIG. 2, the supporting part 330 may be coupled to the guiding part 350 and the guiding support part 350 may guide the supporting part 330 in the up and down directions.

According to an exemplary embodiment of the present invention, the guiding part 350 may include first and second stoppers 351 and 353, a vertical member 357, and the connection member 355.

The first and the second stoppers 351 and 353 may be disposed parallel to each other to face each other in the vertical direction. The first and second stoppers 351 and 353 may be coupled to the vertical member 357 that is positioned in the up and down directions. The first and second stoppers 351 and 353 may be coupled to opposite ends of the vertical member 357.

The first stopper 351 may be coupled to a body 370. The first stopper 351 may be moved in the up and down directions along with the body 370. The body 370 may be coupled to a driver 390 such that a force generated in the driver 390 may be transmitted to the first stopper 351 through the body 370.

Referring to FIG. 2, the first and second stoppers 351 and 353 may limit a moving distance of the connection member 355 that is moved in the up and down directions according to the vertical member 357. The connection member 355 may be moved between the first and second stoppers 351 and 353.

The connection member 355 may be moved between first and second positions that are adjacent to the first and second stoppers 351 and 353. The first position may be a highest point of the connection member 355, and the second position may be a lowest point of the connection member 355.

The connection member 355 may include a penetration hole (not shown) therein. The penetration hole formed in the connection member 355 may correspond to a cross-sectional shape of the vertical member 357. For example, when the cross-section of the vertical member 357 is circular, for example, the penetration hole of the connection member 355 may have a circular shape, and when the cross-section of the vertical member 357 is quadrangular, for example, the penetration hole of the connection member 355 may have a quadrangular shape.

The connection member 355 may be freely moved in the up and down direction according to the vertical member 357.

As described above, two neighboring ends of the pair of supporting members 331 and 333 may be coupled to the connection member 355. The connection member 355 may be moved in the up and down directions according to a state that the pair of supporting members 331 and 333 are coupled.

Referring to FIG. 3 to FIG. 5, a process in which the supporting part 330 and the guiding part 350 are operated while the pressing part 310 presses the film 23 will be described.

First, referring to FIG. 3, before the pressing part 310 contacts the film 23, the connection member 355 is disposed at the second position that contacts the second stopper 353. The connection member 355 may be disposed at the second position that may be the lowest point, as defined by the influence of a gravitation force.

At this time, the pressing part 310 maintains the shape that is convex in the lower direction. When the connection member 355 is positioned at the second position, the angle formed by the pair of supporting members 331 and 333 is minimized.

Next, if the center part of the pressing part 310 contacts the film 23, as shown, for example, in FIG. 4, the connection member 355 may be disposed at the first position. for example, the connection member 355 may be disposed at the position contacting the first stopper 351. Referring to FIG. 4, the pressing part 310 is formed with the convex shape in the lower direction (e.g., a circular shape).

At this time, the angle formed by the pair of supporting members 331 and 333 is the same as the angle formed by the pair of supporting members 331 and 333 before the center part of the pressing part 310 contacted the film 23.

Figure 6:
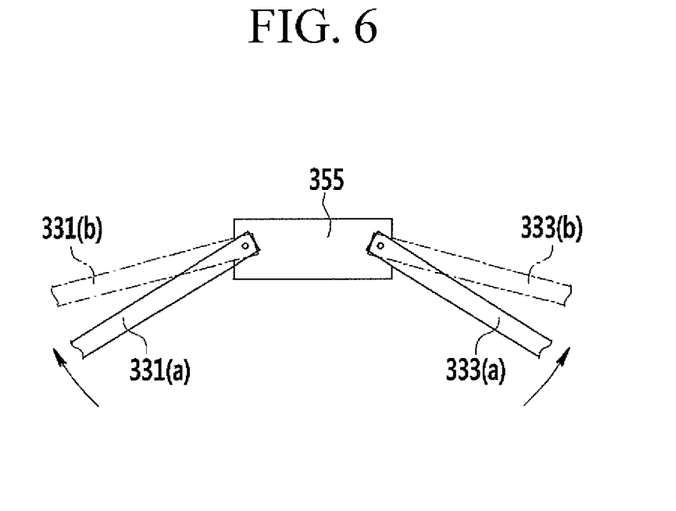
FIG. 6 is a view showing an operation of the supporting part shown in FIG. 2.

After the connection member 355 is disposed at the first position, if the first stopper 351 is moved in the lower direction, the pressing part 310 is transformed into the flat shape. At this time, the angle formed by the pair of supporting members 331 and 333 coupled to both ends of the pressing part 310 is gradually increased, as shown in FIG. 6.

Referring to FIG. 5, the angle formed by the pair of supporting members 331 and 333 becomes a maximum angle when the pressing part 310 has the flat shape. The angle formed by the pair of supporting members 331 and 333 is constantly maintained. For example, although the first stopper 351 presses the connection member 355 in the lower direction, the pair of supporting members 331 and 333 maintain the maximum angle.

While the pair of supporting members 331 and 333 maintain the maximum angle, the pressing part 310 may apply pressure to the film 23. The pressing part 310 of the flat shape may apply constant pressure to the film 23.

When the pressing part 310 with the flat shape applies the pressure to the film 23, uniform pressure may be applied to the film 23 in the length direction of the film 23.

Figure 7:
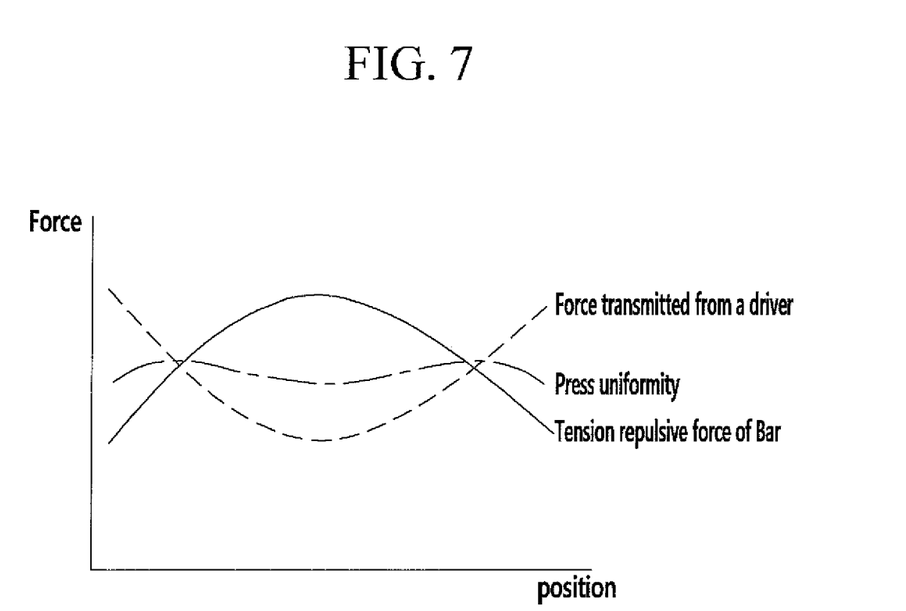
FIG. 7 is a graph of a distribution of an acted force of the pressing part shown in FIG. 2.

FIG. 7 is a graph of a distribution of various forces transmitted to the film 23 by the pressing part 310 according to the position where the force is applied to the film 23 along the length direction.

The force may be generated by the driver 390 and may be transmitted to the pressing part 310. The force reaches its maximum at the position where both ends of the pressing part 310 are coupled to the ends of the pair of supporting members 331 and 333. The force transmitted by the driver 390 may be gradually decreased from both ends of the pressing part 310 to the center part of the pressing part 310.

For Example, the pressing part 310 that is convex in the lower direction may be transformed into the flat shape such that a repulsive force in which the pressing part 310 is restored to the original state may be generated. The repulsive force (in FIG. 7, "Tension repulsive force of Bar") of the pressing part 310 may be increased closer to the center part of the pressing part 310 from both ends of the pressing part 310.

Referring to FIG. 7, "the force transmitted from a driver" and "the Tension repulsive force of Bar" that are opposite to each other are offset such that the pressure distributed to the pressing part (e.g., pressing part 310) is substantially uniform according to "the press uniformity" of FIG. 7.

For example, as described above, when the pressing part 310 with the flat shape applies the pressure to the film 23, the uniform pressure is applied to the film 23 in the length direction of the film 23.

Figure 8:
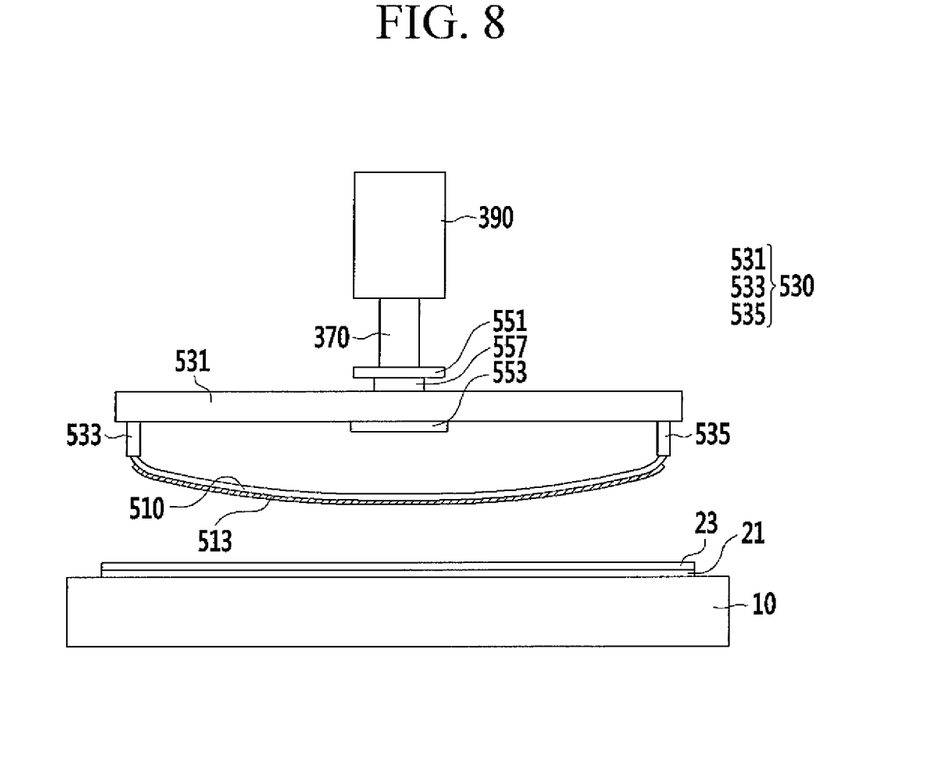
FIG. 8 is a cross-sectional view of a film sticking device according to an exemplary embodiment of the present invention.

FIG. 8 is a cross-sectional view of a film sticking device according to an exemplary embodiment of the present invention.

Referring to FIG. 8, in a film sticking device according to an exemplary embodiment of the present invention, a supporting part 530 may include a first supporting bar 531 and second supporting bars 533 and 535.

The first supporting bar 531 may be a bar-type member extending in the horizontal direction. The first supporting bar 531 may have a shape such that a pair of supporting members are arranged in parallel in the horizontal direction similar to the previously described arrangement. The connection member may have a shape that is integrally formed at the center of the first supporting bar 531.

The second supporting bars 533 and 535 may be coupled to both ends of the first supporting bar 531. The second supporting bars 533 and 535 may be elongated in the lower direction at both ends of the first supporting bar 531.

Opposite ends of a pressing part 510 that may be convex in the lower direction may be coupled to the second supporting bars 533 and 535.

Before the pressing part 510 contacts the film 23, the first supporting bar 531 may be disposed at a second position adjacent to a second stopper 553. When the center part of the pressing part 510 contacts the film 23, the first supporting bar 531 may disposed at the first position adjacent to a first stopper 551.

If the first stopper 551 is moved in the lower direction, the shape of the pressing part 510 is gradually changed into the flat shape.

After the shape of the pressing part 510 becomes the flat shape, if the force is applied to the pressing part 510 through the driver 390, uniform pressure may be transmitted to the film 23, as described above.

The film sticking device according to exemplary embodiments of the present invention is a device for attaching a film to one side of a substrate or a display panel. The film sticking device may apply uniform pressure to the film to be attached to one side of the substrate or the display panel in the length direction of the film. The film may be uniformly attached to the substrate or the display panel.

While the invention has been particularly shown and described with reference to exemplary embodiments thereof, it will be understood by those of ordinary skill in the art that various changes in form and detail may be made therein without departing from the spirit and scope of the invention.

What is claimed is:

1. A film sticking device for pressing a film to a surface, comprising:
    a pressing part configured to press a film by contacting a surface of the film;
    a supporting part coupled to the pressing part and supporting the pressing part;
    a guiding part configured to guide the supporting part to move between a first position and a second position separated from the first position, wherein the guiding part includes first and second stoppers facing each other and respectively positioned at the first and second positions; and
    a body having an end coupled to the guiding part,
    wherein the supporting part is located at the first position when a center part of the pressing part contacts the surface of the film.

2. The film sticking device of claim 1, wherein the pressing part is convex with respect to a direction that it moves in.

3. The film sticking device of claim 2, wherein the pressing part is configured to transform into a shape corresponding to the surface of the film.

4. The film sticking device of claim 2, wherein the guiding part further includes:
    a vertical member extending in a direction vertical to the first and second stoppers, wherein opposite ends of the vertical member are respectively coupled to a side of the first stopper and a side of the second stopper; and
    a connection member coupled to the supporting part, the connection member configured to move between the first and second stoppers according to the vertical member,
    wherein the connection member is configured to contact the first stopper when the center part of the pressing part contacts the surface of the film.

5. The film sticking device of claim 4, wherein the connection member includes a penetration hole passing through the vertical member.

6. The film sticking device of claim 4, wherein:
    the supporting part comprises a first supporting member and second supporting member;
    a first end of the first supporting member and a first end of the second supporting member are coupled to the connection member; and
    a second end of the first supporting member and a second end of the second supporting member are connected to the pressing part.

7. The film sticking device of claim 6, wherein the first supporting member and the second supporting member are arranged in parallel to each other.

8. The film sticking device of claim 6, wherein the first ends of the first and second supporting members coupled to the connection member are configured to be hinge-rotated.

9. The film sticking device of claim 8, wherein the pressing part is configured to transform into a shape corresponding to the surface of the film when an angle formed by extending the first and second supporting members is equal to a maximum angle.

10. The film sticking device of claim 2, wherein the pressing part comprises a stainless use steel (SUS) or a shape memory alloy.

11. The film sticking device of claim 10, wherein a width of the pressing part is in a range of about 10 mm to about 30 mm.

12. The film sticking device of claim 2, further comprising a heating part coupled to a surface of the pressing part, the heating part configured to heat the pressing part.

13. The film sticking device of claim 12, wherein the heating part is heated by a resistance heating method.

14. The film sticking device of claim 13, wherein the heating part comprises a nichrome wire or a metal chromium wire.

15. A film pressing device, comprising:
    a pressing part configured to contact a surface of a film, wherein the pressing part is convex in a lower direction;
    a first supporting bar extending in a horizontal direction, the first supporting bar coupled to the pressing part by second supporting bars extending in a vertical direction from ends of the first supporting bar; and
    a guiding part including a first stopper, a second stopper and a vertical member, the guiding part coupled to the first supporting bar, wherein the first supporting bar is configured to move between the first stopper and the second stopper of the guiding part along the vertical member;
    wherein the first supporting bar is configured to apply a pressure to the pressing part when the first supporting bar is adjacent to the first stopper.

16. The film pressing device of claim 15, further comprising a body coupled to the guiding part and a driver coupled to the body.

17. The film pressing device of claim 15, wherein the pressing part is configured to transform into a shape corresponding to a surface of the film when a pressure is applied by the supporting bar.

18. The film pressing device of claim 15, wherein the second supporting bars extend perpendicularly with respect to each other.

19. The film pressing device of claim 15, wherein the connection member includes a penetration hole through the vertical member.

20. A method for pressing a film to a substrate, comprising:
- pressing a pressing device having a convex shape with respect to a direction that the pressing device moves onto a surface of a film on a substrate;
- sliding a connection member coupled to the pressing device between a second stopper and first stopper and applying a pressure to the pressing device through the first stopper; and
- thereby changing the shape of the pressing device from a convex shape with respect to the direction that the pressing device moves to a flat shape.

* * * * *